May 9, 1950   H. E. ROSE   2,506,743
COMPRESSOR CONTROL
Filed Feb. 12, 1946   2 Sheets-Sheet 1

INVENTOR.
HOWARD E. ROSE
BY
ATTORNEYS

May 9, 1950  H. E. ROSE  2,506,743
COMPRESSOR CONTROL
Filed Feb. 12, 1946  2 Sheets-Sheet 2

INVENTOR.
HOWARD E. ROSE
BY
Richey & Watts
ATTORNEYS

Patented May 9, 1950

2,506,743

UNITED STATES PATENT OFFICE 2,506,743

COMPRESSOR CONTROL

Howard E. Rose, Peninsula, Ohio, assignor to The Weatherhead Company, Cleveland, Ohio, a corporation of Ohio Application February 12, 1946, Serial No. 647,053

4 Claims. (Cl. 230—21)

This invention relates to compressors, more particularly to compressors provided with means to automatically adjust the clearance space in the cylinder, for controlling the amount of pressure developed and the work done by the compressor.

Heretofore there have been many arrangements for the regulation of the output of the compressor, including several devices for effecting this regulation by adjusting the clearance pocket in the compressor cylinder. The devices of the prior art embodied several undesirable features, particularly in connection with the high-speed lightweight compressors currently provided in certain auxiliary installations in aircraft. Prior devices have required complex arrangements of piping, multiple valves, electric contacts and motors, diaphragms, etc., to provide automatic regulation. These systems are heavy, expensive, and subject to maladjustment and they are particularly unsuitable for aircraft installations. Accordingly, it is an object of this invention to provide automatic regulation of pressure without using a complex arrangement of parts by providing a compressor which is at once simple, light in weight and free of maintenance problems. Broadly speaking, this object is attained by providing a movable cylinder head which is automatically positioned to provide a clearance volume of such magnitude that the outlet pressure will remain constant, this cylinder head being positioned by air pressure within the main cylinder, no special valves or other regulating devices being required.

Prior devices which provided a relief valve to bleed off excess pressure were wasteful of power because when the relief valve functioned the compressor pumped an excess of air. It is another object of this invention to provide a control which does not waste any appreciable amount of power during the regulating process. Generally speaking this is accomplished by designing the compressor so that it only draws in enough air to supply the demand at a predetermined pressure.

Other objects and advantages of this invention will be made apparent to those skilled in the art from the description of the accompanying drawings in which.

Figure 1:
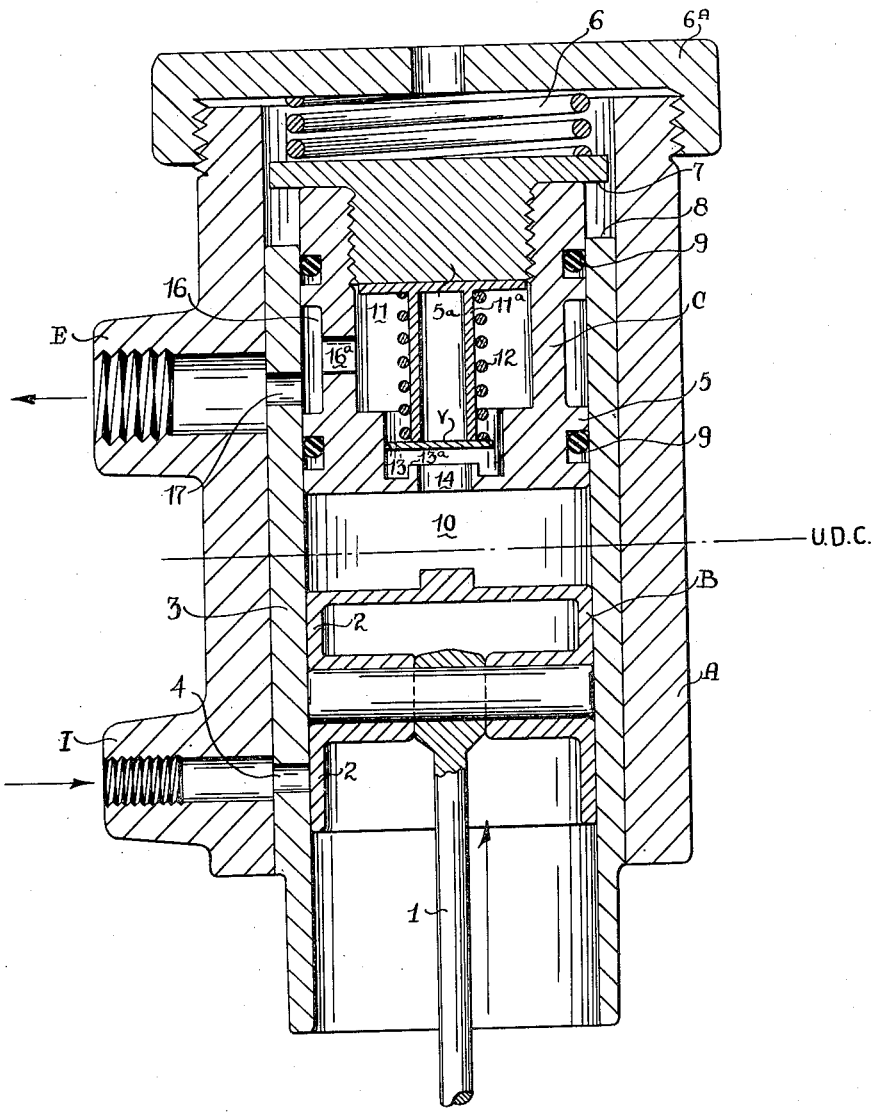
Fig. 1 is a sectional view of the compressor mechanism with the movable cylinder head assuming a position tending to decrease compressor output.

In the illustrated embodiment of the invention the cylinder A is fitted with a reciprocating piston B which piston is driven by the prime mover through connecting rod 1. The piston is provided with a skirt 2 which guides it within a cylindrical sleeve member 3 which member forms part of the cylinder assembly A. Sleeve member 3 is formed with one or more intake apertures 4 and an inlet nipple I or other attaching means for conduits is provided. Sliding within cylinder member 3 is a movable cylinder head C, made of two parts in the illustrated embodiment for ease of manufacture and assembly. These parts are a body portion 5 and a closure portion 5a threaded into the body portion. A spring 6 is provided above the movable cylinder head which spring is retained in the upper portion of the cylinder by an adjustable cap 6a threaded to the cylinder body. Spring 6 urges the movable cylinder head C towards the piston this motion being limited by engagement of a flange 7 on the cylinder head with a portion 8 of the cylinder sleeve member 3.

The movable cylinder head C is fitted with two sets of packing 9 to provide a fluid tight seal for the compression chamber 10. Cylinder head C is formed with a central chamber 11 which houses a check valve assembly. This assembly includes a valve spring guide 11a surrounded by a valve spring 12, and a disc-like check valve V. An aperture 14 is provided in the inner end of the cylinder head C for the egress of the compressed fluid, and an annular groove 13 is formed adjacent this aperture to provide a valve seat 13a for valve V.

Cylinder head C is also formed with an annular reduced portion 16 to which one or more exhaust apertures 16a lead from the chamber 11 within the cylinder head. Annular portion 16 is of sufficient width to permit fluid connection between chamber 11 in the cylinder head and exhaust port 17 in the cylinder sleeve regardless of the position assumed by the cylinder head itself. An exhaust nipple E or other attaching means for an outlet conduit is also provided on the cylinder body A.

Figure 3:
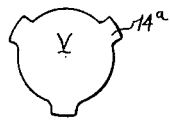
Fig. 3 is a view of the check valve disc.

As seen in Fig. 3, the valve disc V has guiding fingers 14a to center the disc within the chamber confining it.

Having completed the description of the major parts of my improved compressor device, the operation of the device will now be explained. As a background for this explanation, let us assume that it is desired to employ a compressor on an airplane to deliver the desired amount of air at all altitudes without delivering an excess at sea level. It is well known that air density decreases steadily with altitude so that a compressor which produces the required amount of compressed air at the highest altitude would require some method of control to prevent it from producing an excess of compressed air at sea level. Such a control is automatically and simply provided by my invention.

Figure 2:
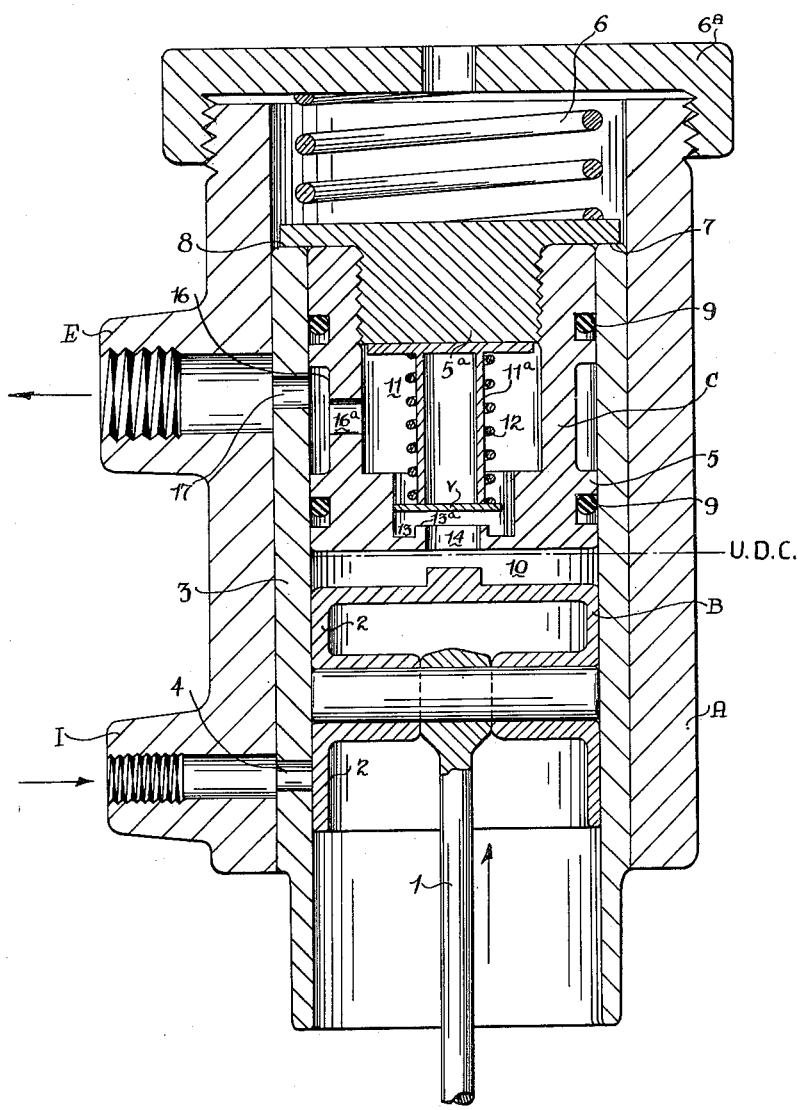
Fig. 2 is a section of the same mechanism with the movable cylinder head in the position where maximum pumping will be produced.

Assume that the adjustable cap 6a has been positioned to so tension spring 6 that the compressor will deliver the desired amount of air at the highest altitude. Then, as illustrated in Fig. 2, at the highest altitude, as the piston approaches upper dead center the movable cylinder head C will remain in the neighborhood of its lower position with flange 7 adjacent stop portion 8 of the cylinder sleeve. As the piston continues its compression stroke clearance volume 10 gradually decreases, and under these circumstances when the piston reaches upper dead center the clearance volume is at a minimum. This means that all the air which entered the cylinder when skirt 2 of the piston uncovered the inlet port 4 is forced out aperture 14, lifting check valve V and exhausting through aperture 16a, 16 and 17 respectively.

The condition of the compressor when operating at lower altitudes is shown in Fig. 1, the cylinder being the same distance from upper dead center in this figure as it was in Fig. 2. However, as the constant stroke piston uncovers the inlet port 4 at lower altitudes, the weight of charge admitted thereby tends to be greater than the weight of charge admitted at higher altitudes. For this reason, for a given piston position on the compression stroke, the pressure within the cylinder always tends to be greater at the lower altitudes. The result is that at lower altitudes, before the piston reaches the end of its compression stroke, the pressure within the cylinder equals that for which the spring was set and once that pressure is equaled, further motion of the piston merely causes the movable cylinder head C to move with it against the spring while discharging air through the valve V. Thus the clearance volume which remains when the piston reaches upper dead center is greater than before, so that although an increased weight of charge was introduced into the cylinder, that excess weight of charge merely remains in the clearance of the cylinder rather than being expelled out the exhaust. Under these conditions as the piston makes its return stroke, the charge in the cylinder re-expands helping push the piston to the intake position and at the end of the stroke the charge remaining in the cylinder is closer to intake pressure, but the only additional charge which enters the cylinder is that equivalent to the amount delivered through the check valve V by the piston on its compression stroke. This arrangement saves power in that no excess over the pre-set amount is delivered by the compressor.

The compressor is designed so that the relation of cylinder head inertia, spring pressure and piston speed is such that the movable cylinder head is incapable of following the piston completely during the exhaust stroke. This means that in some cases the cylinder head C will tend to remain at a position representing a pre-determined mean effective pressure in the cylinder, and in no case will the cylinder head be able to make a complete stroke and strike the cylinder sleeve at 8.

The foregoing explanation of the operation of my compressor control has been made in connection with an aircraft installation which must act upon air of different densities. However, my compressor control can be used to regulate the pressure of air in the receiver at any one altitude or air density, the operation of the device in this case being the same as that previously described. For example, assume that Fig. 2 shows the device operating at a time when the pressure in the receiver connecting to exhaust nipple E equals the pressure for which spring 6 has been set. Now suppose that the demand of air or other fluid from the receiver suddenly stops so that pressure in the receiver tends to build up to a value above the pre-determined value. In this case, as can be seen in Fig. 1, once pressure within the cylinder equals the pre-determined pressure in the receiver system, further motion of the piston in its compression stroke merely raises the movable cylinder head against spring 6. During this phase of the operation no additional air is forced into the receiver, and the additional work done by the compressor is that of compressing spring 6. Excluding friction losses, the work of compressing spring 6 is recaptured on the return stroke. Thus it can be seen that the control of my invention is effected without the need for wasteful bleed off valves in the receiver system. Likewise, it can be seen that the provision of a simple direct acting spring loaded cylinder head provides the necessary regulation and control of the output of the compressor without need of complicated and troublesome external valves and conduit arrangements.

Those skilled in the art will readily appreciate that modifications may be made in many of the design details of my compressor without departing from the spirit of my invention. For example, the valve V and its associated structure can be formed in accordance with the design of standard check valve. Likewise, the cylinder sleeve or liner could be integral with the body of the cylinder. Furthermore, the exact arrangements of inlet and exhaust ports can be modified from that shown in the drawings in accordance with standard practice. These and various other changes in construction and arrangement of the parts may be made without departing from the spirit of the invention as set forth in the appended claims.

Having thus described the present invention so that others skilled in the art may be able to understand and practice the same, I state that what I desire to secure by Letters Patent is defined in what is claimed.

What is claimed is:

1. In combination in a compressor having a reciprocating piston, a cylinder, and inlet and outlet ports; a member slidably mounted in said cylinder and having one face cooperating with said piston and cylinder to define the entire clearance volume in the pressure chamber of said compressor, said movable member having its opposite face subjected to a constant pressure independent of that created by the compressor, said movable member being spring loaded to reduce the clearance volume in said pressure chamber, pressure in said clearance volume acting on said movable member and against said spring to increase the clearance volume during the compression stroke, said movable member being balanced with regard to outlet pressure, means to limit the stroke of said slidable member, the change in clearance volume being uniform and directly proportional to motion of said slidable member during the entire range of motion thereof.

2. In combination in a compressor having a reciprocating piston, a cylinder, and inlet and outlet ports; a member slidably mounted in said cylinder and having one face cooperating with said piston and cylinder to define the entire clearance volume in the pressure chamber of said compressor, said movable member having its opposite face subjected to a constant pressure independent of that created by the compressor, said movable member being spring loaded to reduce the clearance volume in said pressure chamber, pressure in said clearance volume acting on said movable member and against said spring to increase the clearance volume during the compression stroke, said movable member being balanced with regard to outlet pressure, means to limit the stroke of said slidable member, the change in clearance volume being uniform and directly proportional to motion of said slidable member during the entire range of motion thereof, the relation of the inertia of said movable member, the spring loading, and the piston speed being such that the movable member makes only a partial stroke during a cycle.

3. In combination in a compressor having a reciprocating piston, a cylinder, and inlet and outlet ports; a member slidably mounted in said cylinder and having one face cooperating with said piston and cylinder to define the entire clearance volume in the pressure chamber of said compressor, said movable member having its opposite face subjected to an intake pressure, said movable member being spring loaded to reduce the clearance volume in said pressure chamber, pressure in said clearance volume acting on said movable member and against said spring to increase the clearance volume during the compression stroke, said movable member being balanced with regard to outlet pressure, means to limit the stroke of said slidable member, the change in clearance volume being uniform and directly proportional to motion of said slidable member during the entire range of motion thereof.

4. In combination in a compressor having a reciprocating piston, a cylinder, and inlet and outlet ports, a member slidably mounted in said cylinder and having one face cooperating with said piston and cylinder to define the entire clearance volume in the pressure chamber of said compressor, said movable member having its opposite face subjected to a pressure independent of that created by the compressor, said movable member including a chamber having an inlet port and an exhaust port with a check valve therebetween, the exhaust port in said movable member communicating with the compressor exhaust port, the exhaust pressure on said movable member being balanced, said movable member being spring loaded to reduce the clearance volume in said pressure chamber, pressure in said clearance volume acting on said movable member and against said spring to increase the clearance volume during the compression stroke, means to limit the stroke of said slidable member, the change in clearance volume being uniform and directly proportional to motion of said slidable member during the entire range of motion thereof.

HOWARD E. ROSE.

REFERENCES CITED

The following references are of record in the file of this patent:

UNITED STATES PATENTS

| Number | Name | Date |
|---|---|---|
| 800,769 | Steinbart | Oct. 3, 1905 |
| 1,154,798 | Palmer | Sept. 28, 1915 |
| 2,423,677 | Balogh | July 8, 1947 |

FOREIGN PATENTS

| Number | Country | Date |
|---|---|---|
| 1,859 | Australia | of 1931 |